United States Patent
Carroll et al.

(10) Patent No.: US 11,202,225 B2
(45) Date of Patent: Dec. 14, 2021

(54) IOT QOS MONITORING SYSTEM AND METHOD

(71) Applicant: ENDEAVOUR TECHNOLOGY LIMITED, Blackrock (IE)

(72) Inventors: Brian Carroll, Blackrock (IE); Steven Myles, Blackrock (IE)

(73) Assignee: Endeavour Technology Limited, Blackrock (IE)

( * ) Notice: Subject to any disclaimer, the term of this patent is extended or adjusted under 35 U.S.C. 154(b) by 0 days.

(21) Appl. No.: 17/046,852

(22) PCT Filed: Apr. 18, 2019

(86) PCT No.: PCT/EP2019/060054
§ 371 (c)(1),
(2) Date: Oct. 12, 2020

(87) PCT Pub. No.: WO2019/206794
PCT Pub. Date: Oct. 31, 2019

(65) Prior Publication Data
US 2021/0153067 A1 May 20, 2021

(30) Foreign Application Priority Data

Apr. 23, 2018 (EP) .................................. 18168835

(51) Int. Cl.
*H04W 28/02* (2009.01)
*H04W 24/08* (2009.01)
(Continued)

(52) U.S. Cl.
CPC ....... *H04W 28/0268* (2013.01); *H04W 24/08* (2013.01); *H04W 28/24* (2013.01);
(Continued)

(58) Field of Classification Search
CPC ..... H04W 24/08; H04W 24/06; H04W 84/18; H04W 28/0268; H04W 72/0413; H04W 72/042; H04W 28/24; H04L 43/50
See application file for complete search history.

(56) References Cited

U.S. PATENT DOCUMENTS

| 10,257,107 | B1 * | 4/2019 | Hegar ................... H04L 69/161 |
| 2004/0090465 | A1 * | 5/2004 | Robertson ............. H04W 28/14 |
| | | | 715/780 |

(Continued)

FOREIGN PATENT DOCUMENTS

| EP | 2 928 120 A2 | 10/2015 |
| EP | 2 928 120 A3 | 12/2015 |
| EP | 3 070 882 A1 | 9/2016 |

OTHER PUBLICATIONS

International Search Report issued in PCT/EP2019/060054; dated May 21, 2019.
(Continued)

*Primary Examiner* — Syed Ali
(74) *Attorney, Agent, or Firm* — Studebaker & Brackett PC (57) ABSTRACT

Performance of a communications device with a processor, a memory, and a SIM in a wireless communication network is tested to provide a range of QoS KPIs. A test server sends a payload to the device modem, the size of which has been computed to avoid adversely affecting real time performance. The modem uses the payload to fill a buffer of restricted size in the memory, the buffer being smaller than the payload. The modem processor signals the SIM to indicate that data is available in the buffer, and the SIM instructs the processor to purge the buffer. There are repeated cycles until all of the payload has been written to the buffer and purged. The buffer signals the test server to indicate that all of the payload has been written to the buffer and purged, (Continued)

and the server determines a time duration from initial download of the payload to final purging as a downlink performance indicator.

8 Claims, 6 Drawing Sheets

(51) Int. Cl.
    *H04W 28/24*     (2009.01)
    *H04W 72/04*     (2009.01)
    *H04W 84/18*     (2009.01)

(52) U.S. Cl.
    CPC ..... *H04W 72/042* (2013.01); *H04W 72/0413* (2013.01); *H04W 84/18* (2013.01)

(56) References Cited

U.S. PATENT DOCUMENTS

| | | | |
|---|---|---|---|
| 2007/0079207 A1* | 4/2007 | Seidel | H04L 1/1845 714/748 |
| 2008/0215317 A1* | 9/2008 | Fejzo | G10L 19/24 704/217 |
| 2009/0054001 A1 | 2/2009 | Westerberg et al. | |
| 2012/0300649 A1 | 11/2012 | Parmar et al. | |
| 2017/0265210 A1* | 9/2017 | Huang | H04W 72/0453 |
| 2018/0359811 A1* | 12/2018 | Verzun | H04L 12/28 |
| 2019/0229788 A1* | 7/2019 | Zhang | H04L 5/0098 |
| 2020/0037199 A1* | 1/2020 | Wang | H04W 72/14 |
| 2020/0163005 A1* | 5/2020 | Rao | H04W 76/14 |
| 2020/0296673 A1* | 9/2020 | Ouchi | H04W 52/325 |
| 2020/0305094 A1* | 9/2020 | Ouchi | H04L 5/0055 |
| 2020/0389264 A1* | 12/2020 | Hedayat | H04L 1/1896 |

OTHER PUBLICATIONS

Sim Alliance, Smart Card Web Server Stepping Stones, Dec. 9, 2009, p. 23-p. 30, Figure 7, OMA 1.1, Version 1.0.0., Retrieved from the Internet: URL:http://simalliance.org/wp-content/uploads/2015/03/SCWS_Steppingstones_2009_v1.0.01.pdf [retrieved on Nov. 10, 2015].

* cited by examiner

IOT QOS MONITORING SYSTEM AND METHOD

INTRODUCTION

The invention relates to monitoring of Quality of Service ("QoS") in communication networks in which there is wireless communication.

US2012/0300649 (w2bi, Inc) describes a method of testing data throughput rate on a mobile device in which a data call and a data transfer is originated and an applet calculates elapsed time of file transfer and throughput rate to simulate end user events.

EP2928120 (Regeneris (Glenrothes) Ltd) describes a portable test apparatus with a cable modem termination system.

The invention applies particularly to such monitoring at the extremities of networks, at the device level. In general, at the device level the minimisation of latency is very important, especially if the messages are real time control messages for equipment.

An object of the invention is to achieve accurate real time monitoring of QoS at the device level in wireless communication networks.

Glossary

2G Second Generation
3G Third Generation
4G Fourth Generation
API Application Programmable Interface
APN Access Point Name
AWS Amazon Web Services
BIP Bearer Independent Protocol
DF Dedicated File-Box
E-UTRAN Evolved Universal Mobile Telecommunications System Terrestrial Radio Access Network
EcNo/Eclo Signal Energy/Spectral Density of Noise or Interference
EF Elementary File-Box
GPRS General Packet Radio Service
HSDPA High-Speed Downlink Packet Access
HTTP Hypertext Transfer Protocol
HTTPS Hypertext Transfer Protocol Secure
ICCID Integrated Circuit Card Identifier
IMSI International Mobile Subscriber Identity
KPI Key Performance Indicator
LAC Location Area Code
LTE Long Term Evolution
MCC Mobile Country Code
MNC Mobile Network Code
MNO Mobile Network Operator
MSISDN Mobile Station Integrated Services Digital Network
NMR Network Measurement Results
OS Operating System
OTA Over-The-Air
OTA RAM Remote Applet Management (to avoid confusion OTA will be associated to this acronym)
QoS Quality of Service
RAM Random Access Memory
RSCP Received Signal Code Power
RSRP Reference Signal Received Power
RSRQ Reference Signal Received Quality
RxLev Received Signal Level
RxQual Received Signal Quality
SIM Subscriber Identity Module
SMS Short Message Service
STK SIM Toolkit
UE User Equipment
UICC Universal Integrated Circuit Card
UMTS Universal Mobile Telecommunications System

SUMMARY

We describe a method of testing performance of a communications device with a processor, a memory, and a SIM in a wireless communication network, the method comprising the steps of:
(a) a test server sending a payload having a payload size to the device,
(b) the device processor using the payload to fill a buffer of restricted size in the memory, the buffer being smaller than the payload,
(c) the processor signalling the SIM to indicate that data is available in the buffer,
(d) the SIM (4) instructing the processor to purge the buffer,
(e) repeating steps (c) and (d) until all of the payload has been written to the buffer and purged,
(f) the buffer signalling the test server to indicate that all of the payload has been written to the buffer and purged,
(g) the test server (1) determining a time duration from start of (a) to end of (f) as a downlink performance indicator.

wherein the test server determines a download speed parameter value according to the algorithm:

$$\text{Download Speed} = \frac{\text{Payload}}{t_{data} - t_{comms}}$$

in which,-Payload is size of the payload;
$t_{data}$ is time from start of step (a) to end of step (f); and
$t_{comms}$ is time for the signalling of steps (c) and (d).

Preferably, in step (a), the payload is included in a post request from the test server, and the $t_{data}$ parameter is calculated by the test server as the time from the post request initial test trigger to end of step (f).

Preferably, the SIM uses an application (5) downloaded from the test server for said test processing.

Preferably, the memory and the SIM are within a modem of the device.

Preferably, the method further comprises performing an uplink test in which:
(i) the SIM sends data to the buffer,
(ii) when the buffer is full the device processor uploads the buffer data to the server,
(iii) the server determines a time value for said upload of step (ii) as indicative of uplink performance Preferably, the server initially, before step (i) determines time from said download to step (ii) according to $$\text{Uplink Speed} = \sum_{i=0}^{n} \frac{L_{buffer}}{t_{dataup} - t_{commsup}}$$

in which,-$L_{buffer}$ is size of the buffer, which equals the size of each data upload;
$t_{dataup}$ is time of step (ii); and
$t_{commsup}$ is time for the signalling for sending the data from the SIM to the buffer in step (i)

Preferably, wherein the $t_{dataup}$ parameter is calculated on the test server as the time from initial packet received to final packet received, and the $t_{commup}$ parameter is measured and calibrated by laboratory testing.

Preferably, the server determines a plurality of time periods for multiple occurrences of steps (i) and (ii) and averages them for improved accuracy.

Preferably, the server performs a latency test by sending a test signal to the SIM and determining time for a response to be received.

Preferably, the server determines a desired size for the payload according to a calculation to ensure that real time performance is not adversely affected.

Preferably, the payload sizing is lower for slower connections at the device and higher for faster connection.

We also describe a wireless network test system comprising a test server and a device configured to perform a method of any embodiment.

We also describe a non-transitory computer storage medium comprising software code for performing the method of any embodiment when executed by a digital processor.

Additional Statements

We describe a method of testing performance of a communications device with a processor, a memory, and a SIM in a wireless communication network, the method comprising the steps of:
- (a) a test server sending a payload to the device,
- (b) the device processor using the payload to fill a buffer of restricted size in the memory, the buffer being smaller than the payload,
- (c) the processor signalling the SIM to indicate that data is available in the buffer,
- (d) the SIM instructing the processor to purge the buffer,
- (e) repeating steps (c) and (d) until all of the payload has been written to the buffer and purged,
- (f) the buffer (6) signalling the test server to indicate that all of the payload has been written to the buffer and purged,
- (g) the test server determining a time duration from (a) to (f) as a downlink performance indicator.

Preferably, the teat server determines a download speed parameter value according to the algorithm:

$$\text{Download Speed} = \frac{\text{Payload}}{t_{data} - t_{comms}}$$

in which,-Payload is size of the payload;
$t_{data}$ is time from step (a) to step (f); and
$t_{comms}$ is time for the signalling of steps (c) and (d).

Preferably, the payload is included in a HTTP Post Request from the test server, and the $t_{data}$ parameter is calculated by the test server side as the time from initial test trigger to final packet received, and the $t_{comms}$ parameter is measured and calibrated through laboratory testing.

Preferably, the SIM uses an application downloaded from the test server for said test processing.

Preferably, the memory and the SIM are within a modem of the device.

Preferably, the method further comprises performing an uplink test in which:
- (i) the SIM sends data to the buffer,
- (ii) when the buffer is full the device processor uploads the buffer data to the server,
- (iii) the server determines time for the transfer as indicative of uplink performance Preferably, the server initially, before step (i) the SIM generates the test data, and determines time from said download to step (ii).

$$\text{Uplink Speed} = \sum_{i=0}^{n} \frac{L_{buffer}}{t_{data} - t_{comms}}$$

in which,-$L_{buffer}$ is size of the payload;
$t_{data}$ is time from step (ii); and
$t_{comms}$ is time for the signalling in step (i)

Preferably, the payload is generated on the SIM for each buffer fill and equals the total size of the buffer.

Preferably, the $t_{data}$ parameter is calculated on the server side as the time from initial packet received to final packet received, and the $t_{comm}$ parameter is measured and calibrated by laboratory testing.

Preferably, the server determines a plurality of time periods for multiple occurrences of steps (i) and (ii) and averages them for improved accuracy.

Preferably, the server performs a latency test by sending a test signal to the SIM and determining time for a response to be received.

Preferably, the server determines a desired size for the payload according to a calculation to ensure that real time performance is not adversely affected.

Preferably, the payload sizing is lower for slower connections at the device and higher for faster connection.

We also describe a wireless network test system comprising a test server and a device configured to perform a method as defined above in any embodiment.

We also describe a non-transitory computer storage medium comprising software code for performing the method of any embodiment when executed by a digital processor.

DETAILED DESCRIPTION OF THE INVENTION

The invention will be more clearly understood from the following description of some embodiments thereof, given by way of example only with reference to the accompanying drawings in which:

FIGS. 5(*a*), (*b*), and (*c*) show a flow for a downlink test for transfer of data from the server to the device, and how this test fits in with other tests.

Figure 1:
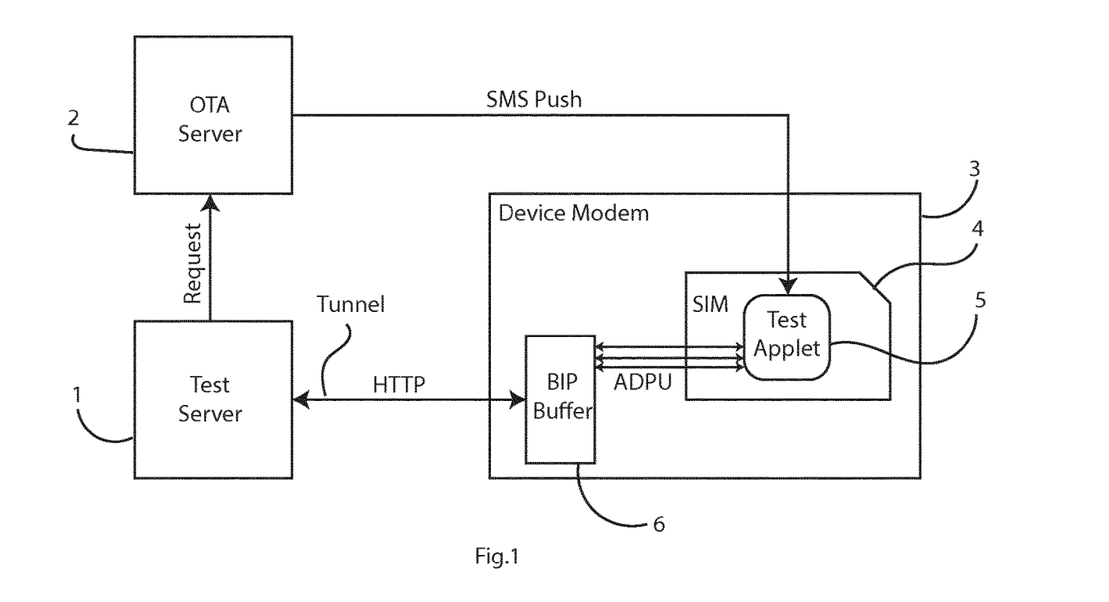
FIG. 1 is a block diagram illustrating servers and a device of the invention.

Referring to FIG. 1 the components involved in QoS monitoring at a wireless network edge are shown. A test server 1 communicates with an OTA server 2, and both communicate with a device modem 3. The modem 3 may be in a device of any desired type such as typically a car.

The modem 3 comprises a SIM4 which runs a software application ("Applet") 5. The modem 3 also comprises a Random Access Memory which is partitioned by the modem's processor (not shown) into a buffer 6.

Test Server 1

The test server 1 is a Linux™ deployment with a Postgres™ database (AWS hosted or locally hosted). Test service software is deployed which handles triggering of tests, configuration of the SIM applet 5, and storage and processing of captured test data.

The test server 1 handles all whitelisting or blacklisting requirements as well as determining where and when additional tests need to be run in order to provide a full view of the network with minimum network impact.

OTA Server 2

OTA Server—This is owned and controlled by the Mobile Network Operator, MNO. This is used to send SMSs to the SIM applet with the required cryptography. The test server 1 integrates with the OTA server 2 to provide this functionality.

The OTA server 2 initiates benchmarking. If the test server 1 triggered testing is used the OTA server 2 is required to start a benchmark process from the server side, and access to the OTA Server is required. According to the available API, integration will have to be in place to allow the server 2 to deliver a triggering SMS to the SIM applet 5.

The OTA server 2 also performs Applet deployment, although this could alternatively be performed by direct installation on the SIM.

SIM Card 4

The SIM card is based on a Java Card UICC operating system and implements the UICC specifications Release 8 or higher. To run the SIM applet 5, a specific DF and application EFs are created. The memory within which the applet 5 is partitioned has 20 kB of non-volatile and 1 kB of RAM. From the perspective of the wireless network between the servers 2 and the device modem 3, the modem 3 is within the user equipment (UE) and is used to communicate with the network. The SIM Card is inserted in the modem to provide the connectivity authentication from the client side. This is also where the SIM applet is installed.

The SIM Applet is the client-side service which captures various QoS key performance indicators (KPIs) and sends these back to the test server 1.

FIG. 1 shows a typical communication flow between each of these elements:

- The test server 1 triggers a request to evaluate the connectivity on a target device 2.
- A benchmarking process starts by triggering an SMS through the OTA server 2.
- The SIM Applet 5 receives the SMS from the SIM Card 4 OS.
- The SIM Applet 5 uses STK commands and BIP capabilities of the modem to open a BIP channel and establish a HTTP connection to the test server 1.
- The test server 1 and the Applet 5 exchange payloads for connectivity evaluation.

The SIM Applet 5 captures the QoS KPIs, as defined in Network Measurement Results (NMR) Decoded KPIs below, read directly from the interface to the modem and decoded from the NMR data. These KPIs are captured periodically and can be used to trigger the client-side initiated connection.

Figure 5A:
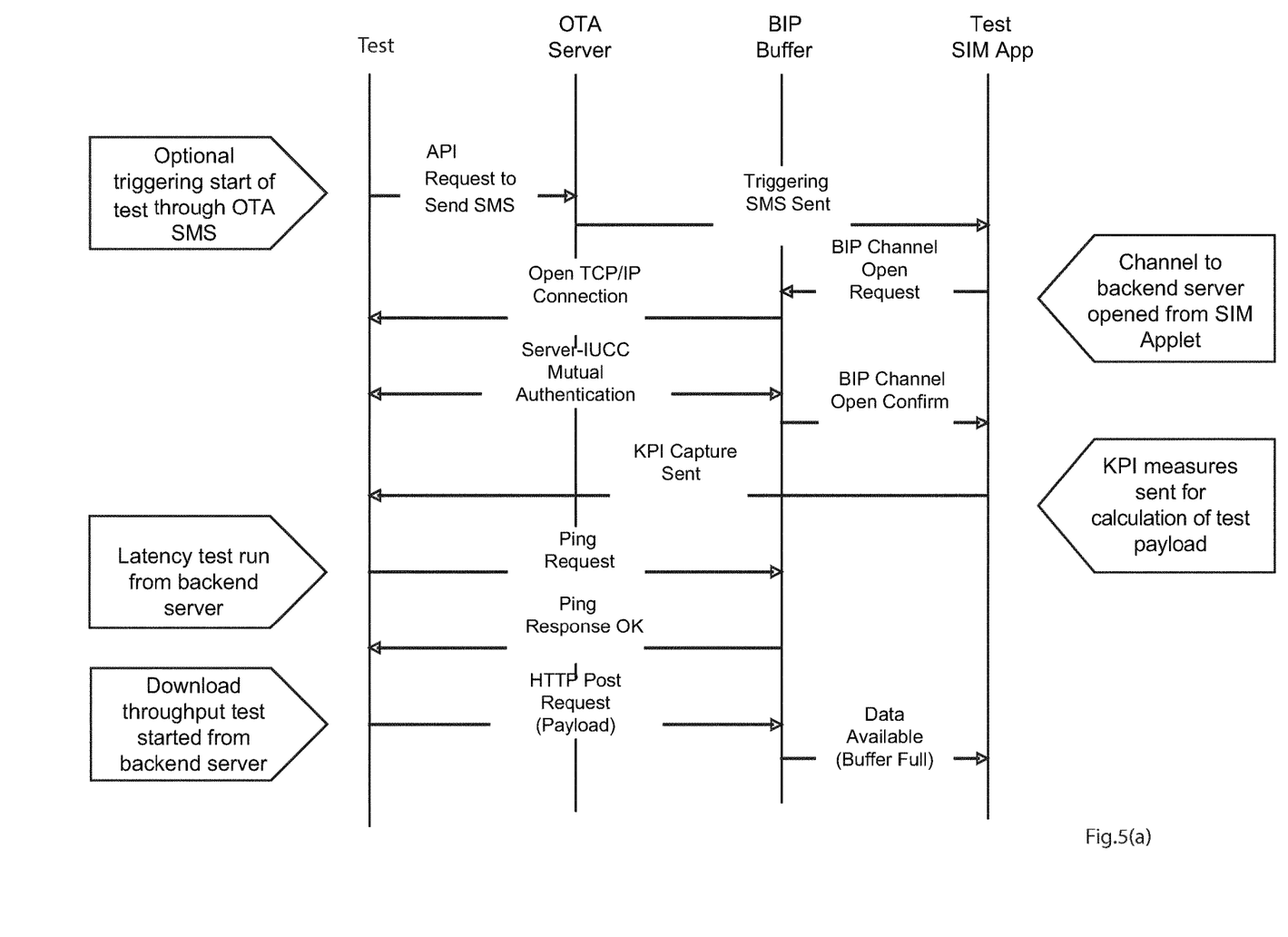
Figure 5B:
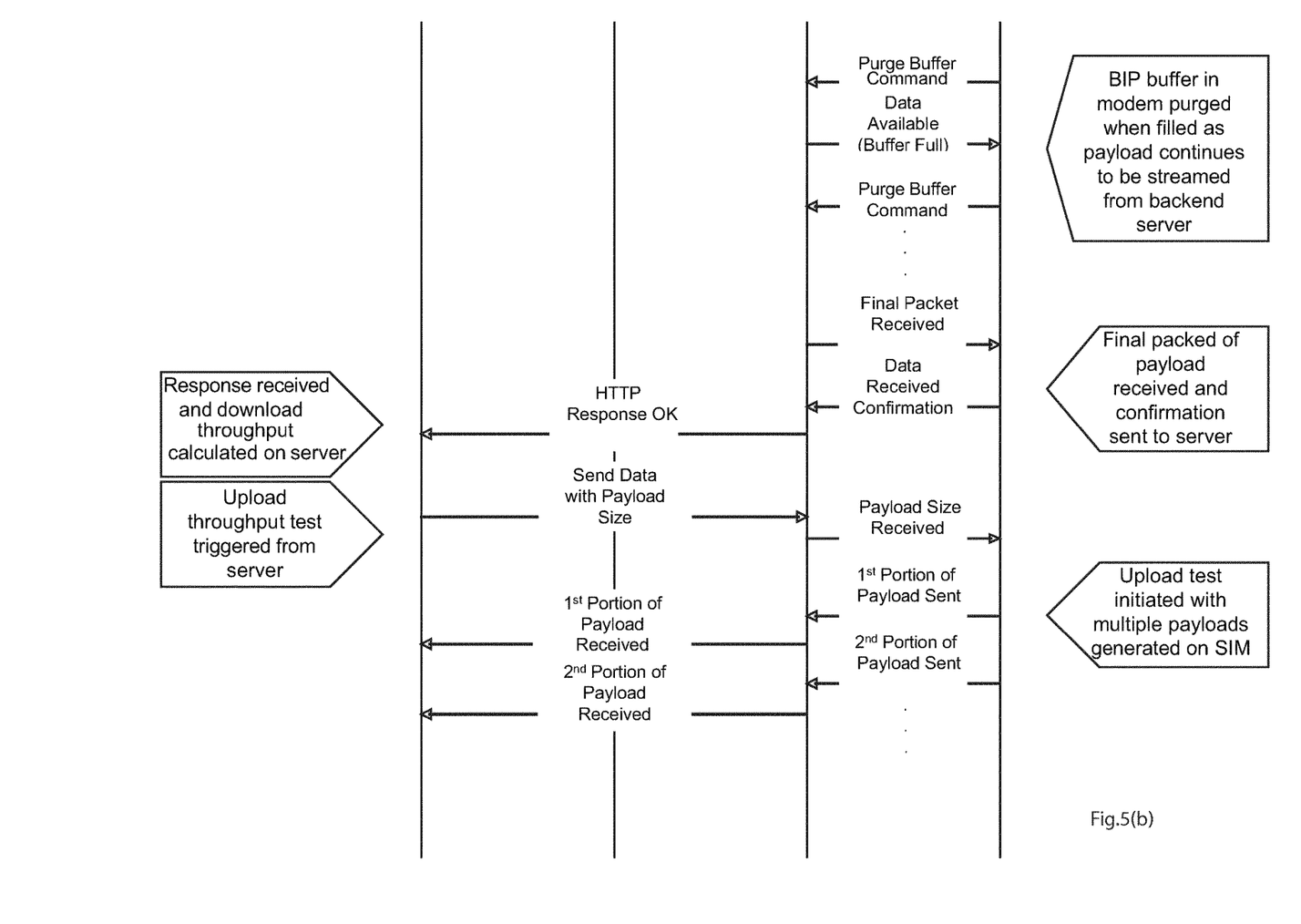
Figure 5C:
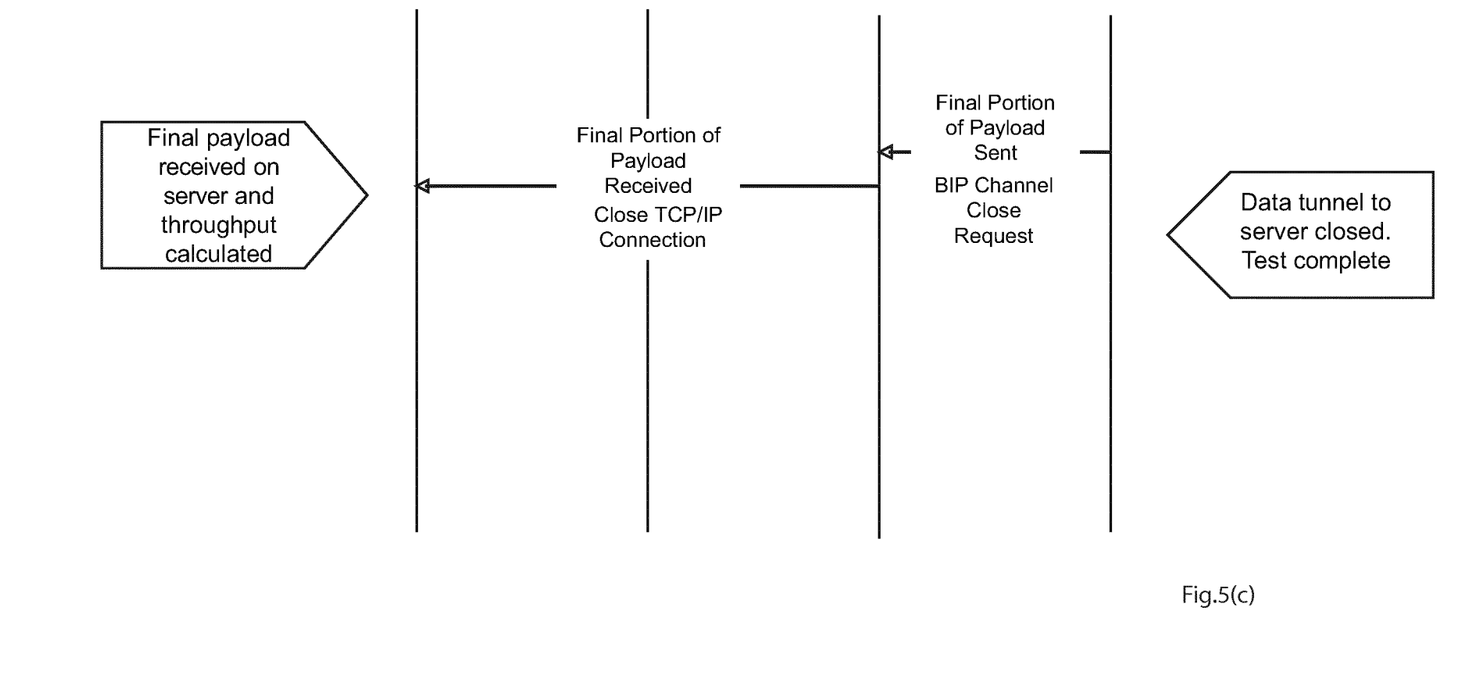

Dimensions
Cell
Cell_id
Cell_LAC
Cell_MCC
Cell_MNC
Cell Network
Cell_Country
Connection
Data Connection (LTE, 3G, 2G)
Connection Type (E-UTRAN, UMTS, HSDPA, etc.)
SIM
ICCID
IMSI
MSISDN
NMR Decoded KPIs
4G Signal Quality (RSRQ)
4G Signal Strength (RSRP)
3G Signal Quality (EcNo/Eclo)
3G Signal Strength (RSCP)
2G Signal Quality (RxQual)
2G Signal Strength (RxLev)
Throughput Test Process FIGS. 5(*a*), (*b*), and (*c*) illustrate the end-to-end test process from initial establishment of the connection to collection and storage of the results.

Connection Setup

The connection to the test server 1 can be initiated either from the SIM applet 5 (client side) or from the test server 1 through the OTA server 2.

Server Initiated

The test server 1 sends a request to the OTA Server 2 through the OTA Server API. The request defines the command to send to the SIM Applet 5 and the preferred SIM identifier (ICCID, IMSI, or MSISDN). The command contains the following information, required to establish the connection with the server:

APN
BIP buffer size
Server address and port

Figure 2:
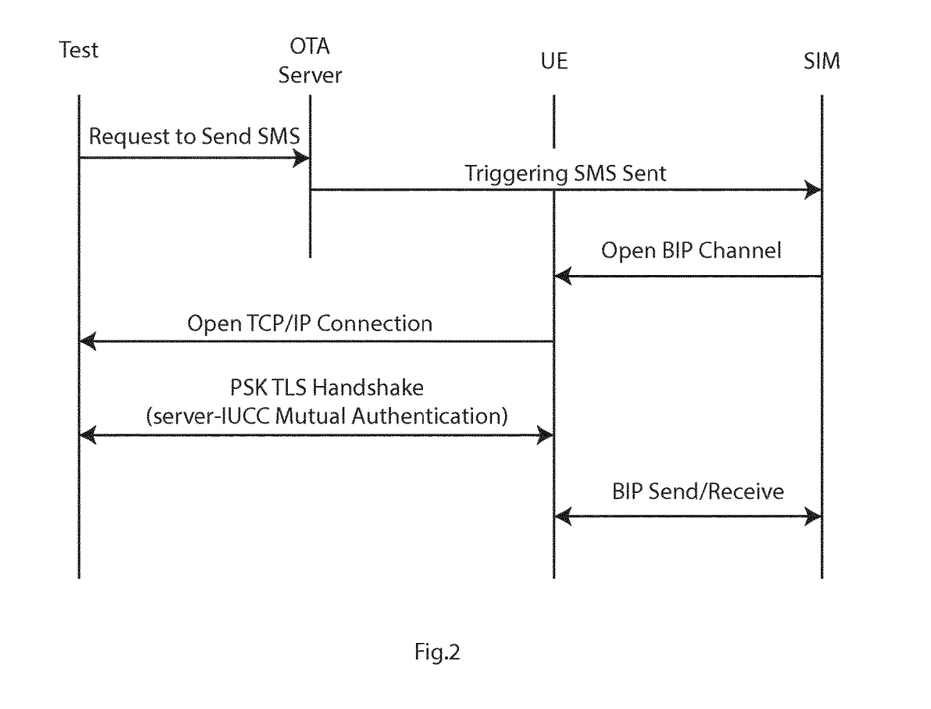
FIG. 2 is a flow diagram for opening of a channel between a server and the device modem subscriber Identity Module (SIM) initiated by the server.

The OTA Server 2 wraps this request in a single SMS with encryption and delivers this to the target SIM4. This triggers the applet 5 to start the benchmarking process.

After the SMS is received, the initial phase of the process is to establish a HTTPS connection between the device modem 3 and the test server 1. When the SIM is opening the BIP channel it defines the BIP buffer length ($L_{buffer}$). This connection and HTTPS tunnel setup also includes the cryptographic handshake.

SIM Initiated Test

Figure 3:
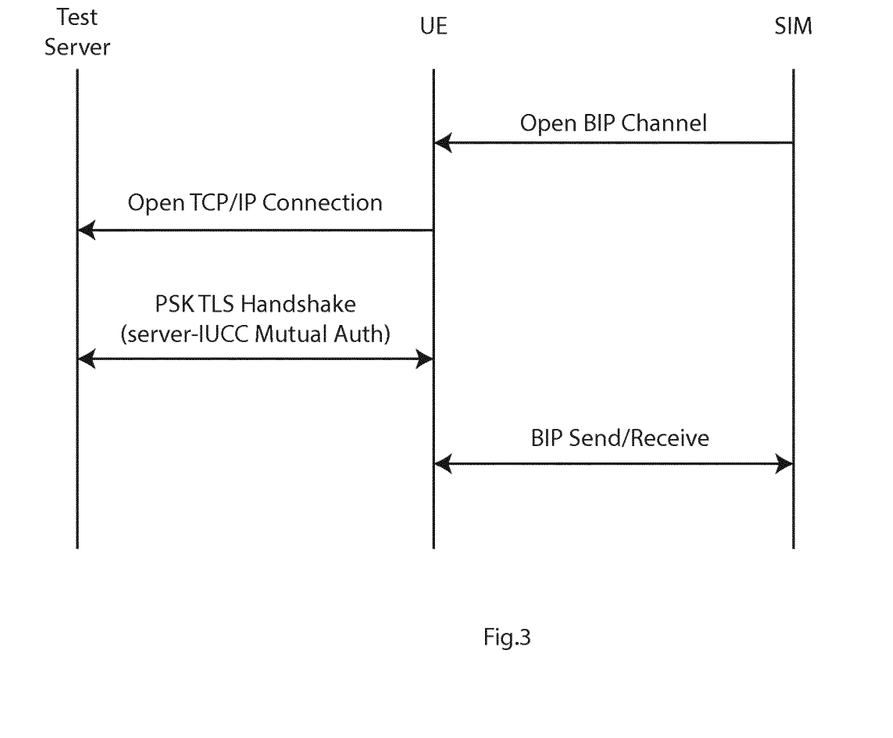
FIG. 3 is a flow diagram for opening of a channel between a server and the device modem subscriber Identity Module (SIM) initiated by the SIM.

Any KPIs can be used by the SIM Applet 5 to trigger a full throughput test. In this case the process identified above is shortcut. If this flow is to be used the server connection details are stored in the SIM Applet 5 at deployment time. A major advantage of this method is that the OTA server 2 is not required for the triggering phase. In this configuration the OTA server 2 is only used for Applet deployment and update.

When one of the trigger conditions are met the SIM Applet 5 opens an HTTPS connection with the BIP commands based on STK proactive commands (OPEN CHANNEL, SEND DATA, RECEIVE DATA) to establish the connection with the server, including the cryptographic handshake.

In this case the first communication to the test server 1 includes the current QoS KPI capture. This allows the server 1 to calculate the payload size required to accurately measure the speed of the connection. Hence the payload size is pre-determined and fixed. Examples of the KPI triggers that can be used are:

Technology change—occurs when modem or device reselects a new technology

Cell Change—occurs when modem or device reselects a new technology

Periodical—every X (configurable) minutes a periodical event can be triggered

Triggering based on observed behaviour on the client side has a number of key benefits:

Assurance of good customer experience by limiting the test frequency based on time or activity. Thresholds can be set in the test SIM Applet 5 to allow a maximum of one test per end user per day/week/month. Similarly, if a user is only active in a small area there is not necessarily a need to continually test in that area, so the test frequency can be reduced.

Ensure good area/network coverage. By triggering on network changes such as cell change it is possible to only execute a throughput test on unique cells seen in a period. This results in a good coverage of tests without impacting the network capacity adversely.

In the case of any client side triggers the QoS KPIs can be captured as required even if a full speed test isn't performed.

Latency Test

Once the initial connection has been established the three legs of the data connection testing can begin.

The initial part of the throughput testing is a latency test. A simple ping is used to measure this. The ping allows testing of the access time between the device and server through the network. It measures the time it takes to get a response from the device once the request has been sent from the server. The faster the ping response is, the better the connection. Latency is measured in milliseconds (ms).

Figure 4:
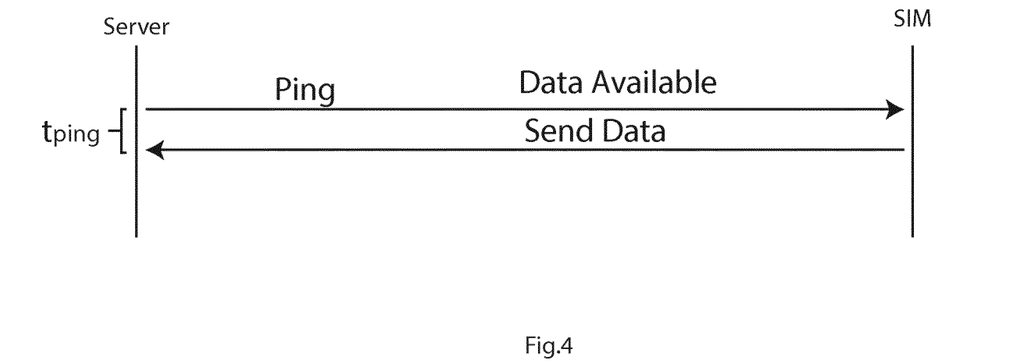
FIG. 4 shows a flow for an initial latency test.

Referring to FIG. 4, when the connection is established, the server sends a request to the SIM applet 5 which receives a notification of the ping request. The SIM applet 5 replies with an acknowledgement to the server 1. The server 1 records the time $t_{ping}$ between the request and the response.

The server 1 records the time, and not the SIM applet. The SIM applet is not aware of the time. It can request the time from the modem through Time Management STK commands, but this time cannot be guaranteed to be accurate.

Downlink Test (FIG. 5)

Downlink refers to the transferring of data from the test server to the device modem 3. The downlink speed measures how fast data takes to reach the device modem 3 once it has been sent from the test server 1. In most of the cases, the requirements from downlink speed are much higher than for uplink speed as loading large files such as video files, streaming videos or other large data is very common. The downlink speed is measured in megabits per second (Mbps).

Payload Sizing

Before starting a throughput test the test server 1 accurately sizes the payload to optimise for measurement accuracy and data usage. In the context of a throughput test it is advantageous to be as accurate as possible at lower connection speeds (<5 Mbps) but at higher speeds, when monitoring QoS, the accuracy is not as important. This distinction is important, as, for higher speeds obtaining a very accurate result requires a lot larger files size.

Payload sizing is preferably lower for slower connections and higher for faster connection due to the properties of network communication. For the initial portion of the test the speed of throughput ramps to a steady state. The payload needs to be sized to allow this ramp up time and for the connection to reach a steady state speed.

Based on testing the following table outlines the files sizes required for each connection type. Payload sizing is designed to provide accurate results while ensuring the network is not burdened with additional data.

| Connection | Signal Quality | Payload Size | Accuracy |
|---|---|---|---|
| GPRS | Poor | 500 Kb | ±5% |
| GPRS | OK | 500 Kb | ±5% |
| GPRS | Good | 500 Kb | ±5% |
| UMTS | Poor | 1 Mb | ±5% |
| UMTS | OK | 3 Mb | ±10% |
| UMTS | Good | 5 Mb | ±10% |
| LTE | Poor | 5 Mb | ±10% |
| LTE | OK | 10 Mb | ±10% |
| LTE | Good | 20 Mb | ±10% |

Connection

This is the connection technology at time of test. The table highlights three technologies as a illustrative example for each of the technology generations 2G, 3G and 4G. Testing is not limited to these technologies.

Signal Quality

This is a broad indication of the signal strength and quality at the time of test. For GPRS this means RxQual and RxLev, for UMTS this is RSCP and EcNo, and for LTE this is RSRQ and RSRP. Note that testing is not limited to these technologies only. The lower signal quality typically requires a smaller payload as the maximum speed possible in this scenario is typically lower.

Accuracy

This is the test result accuracy that will be possible based on the payload sizing identified. The result is related to the true speed of the network.

To calculate the downlink speed the test server 1 first calculates the payload required to give an accurate result. This calculation is based on the received QoS KPIs from the SIM Applet 5 i.e. connection type, signal strength and signal quality. For a faster, better quality, connection the payload size must be increased in order to accurately calculate the throughput.

The flow for the downlink test is shown in FIG. 5.

The test server 1 sends the payload as a HTTP Post Request. The payload is read to the BIP buffer 6 and when full the SIM 4 is notified. The SIM 4 acknowledges and sends a response to the device processor to purge the buffer 6. This cycle between the BIP buffer and SIM is repeated until the final byte of the payload is received. At this point the SIM initiates a HTTP Response through the BIP channel notifying the server of the size of the data effectively received.

The SIM applet 5 is just receiving the notification from the UE (device processor) and not reading the data stored in the BIP buffer 6.

To capture a more accurate overall result this entire process can be repeated, and the downlink throughput calculated as the mean of the values measured.

The ping time is removed from the calculation to account for the acknowledgement time.

In more detail, the full sequence from triggering of a start of the tests through the latency test run and the download test are shown.

The size of the payload is much greater than that of the buffer 6 of the modem. The flow from the test server 1 to the buffer 6, HTTP Post Request (Payload) is a data streaming message, and the payload floods the buffer 6. When full, the buffer 6 signals this to the SIM (Data Available (Buffer Full)). The payload size was previously determined so that performance of the downlink test does not affect performance The next step is that the SIM 4 purges the buffer 6. This causes the server 1 to continue to send data which fills the buffer 6, causing it to operate on the basis that it has a capacity of say 1 MB instead of its physical capacity of only 64 kB.

The time in the vertical axis between the HTTP Post Request and the HTTP Response OK message, called $t_{data}$, is key parameter for the test server 1 to calculate the throughput. This is as according to the algorithm:

$$\text{Downlink Speed} = \frac{\text{Payload}}{t_{data} - t_{comms}}$$

in which:

Payload, is the size of the payload in the HTTP Post Request;

$t_{data}$, is the time as set out above. It is calculated on the server side as the time from initial test trigger to final packet received;

$t_{comms}$, is the time for the Data Available/Purge cycles between the buffer 6 and the SIM 4, as measured and calibrated through lab testing. The time is directly related to the number of buffer fill and purge cycles performed during a test.

Uplink Test

Figure 6:
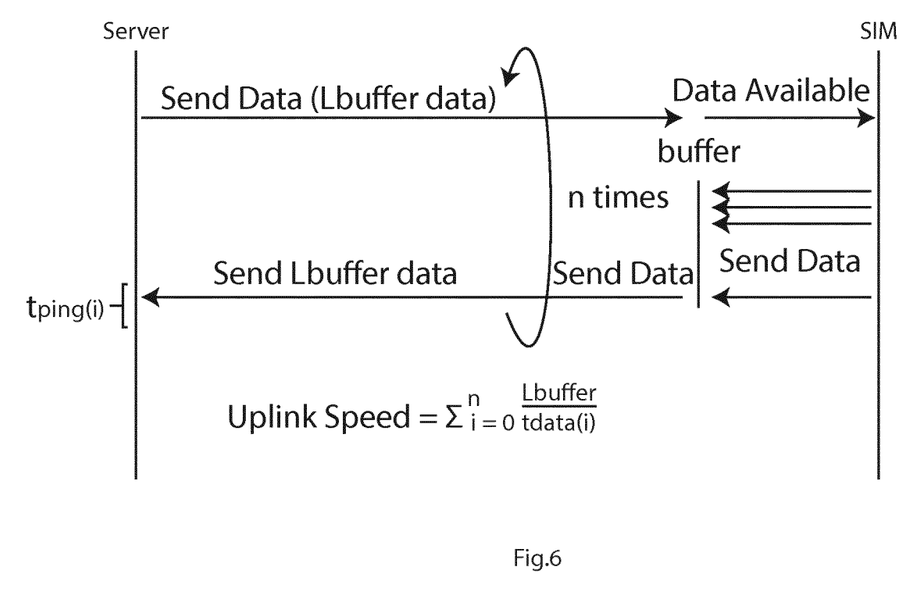
FIG. 6 is a flow for an uplink test.

This is illustrated in the remainder of FIG. 5 and in FIG. 6. Essentially, the SIM applet 5 keeps filling the buffer 6 using data generated within the applet 5 based on payload sizing as determined by the test server 1. Uplink refers to the transferring of data from the device to the host server. The uplink speed measures how fast data takes to reach the host server once it has been sent from the device. The uplink speed is critical for sending data such as telemetry data. The uplink speed is measured in megabits per second (Mbps).

To evaluate the uplink speed, the SIM applet 5 sends Send Data STK commands to fill the buffer with $L_{buffer}$ bytes and then requests the modem to send the whole content of the buffer to the test server 1.

The server 1 measures the time to receive the full content of the whole buffer.

This operation is executed n times to make the final measurement more accurate.

The uplink speed is evaluated by adding all data received by the server and dividing by the time needed for all packet transmission.

As shown in FIG. 6 the uplink speed algorithm aggregates the $L_{buffer}$ divided by the $t_{dataup}$ parameter over the n cycles.

$$\text{Uplink Speed} = \sum_{i=0}^{n} \frac{L_{buffer}}{t_{dataup} - t_{commsup}}$$

in which:

$L_{buffer}$, is the size of the payload generated on the SIM for each buffer fill. This equals the total size of the buffer;

$t_{dataup}$, is the time for sending payload to server. Calculated on the server side as the time from initial packet received to final packet received.

$t_{commsup}$, is the time for the communication between the buffer 6 and the SIM, as measured and calibrated through lab testing. The time will be directly related to the number of buffer fill and send cycles performed during a test.

Impact on Normal Operation

The throughput testing procedure is designed to be non-intrusive on normal SIM activity. Tests are not run during periods of SIM communication with the network for cryptographic authentication. Similarly, configuration of the applet enables setting of relative priority for applets co-located on the SIM. The tests will not commence if another operation of higher priority requires resources.

The testing procedure also is designed to minimise impact on the network. Payload sizing is set to balance test result accuracy without unnecessarily flooding a network with additional traffic. Also, testing can be restricted in a geographical area to limit unnecessary additional tests for network elements which have already been tested.

It will be appreciated that the invention provides for very accurate and effective testing of communication times in wireless networks, at a level which accurately reflects true performance at the device level. This allows network operators to quickly identify parts of the network where latency may become a problem, such as for devices which need to receive messages in real time for example, for control of equipment.

The invention is not limited to the embodiments described but may be varied in construction and detail.

The invention claimed is:

1. A method of testing performance of a wireless network test system comprising a test server and a communications device with a processor, a memory, and a SIM in a wireless communication network, the method comprising the steps of:
   (a) the test server sending a payload having a payload size to the device,
   (b) the device processor using the payload to fill a buffer of restricted size in the memory, the buffer being smaller than the payload,
   (c) the processor signalling the SIM to indicate that data is available in the buffer,
   (d) the SIM instructing the processor to purge the buffer,
   (e) repeating steps (c) and (d) until all of the payload has been written to the buffer and purged,
   (f) the buffer signalling the test server to indicate that all of the payload has been written to the buffer and purged,
   (g) the test server determining a time duration from start of (a) to end of (f) as a downlink performance indicator;
wherein the test server determines a download speed parameter value according to the algorithm:

$$\text{Download Speed} = \frac{\text{Payload}}{t_{data} - t_{comms}}$$

in which,-Payload is size of the payload;

$t_{data}$ is time from start of step (a) to end of step (f); and $t_{comms}$ is time for the signalling of steps (c) and (d);

wherein the method further comprises performing an uplink test in which:
   (h) the SIM sends data to the buffer,
   (i) when the buffer is full the device processor uploads the buffer data to the server,
   (j) the server determines a time value for said upload of step (i) as indicative of uplink performance;
the server initially, before step (h) determines time from said download to step (i) according to:

$$\text{Uplink Speed} = \sum_{i=0}^{n} \frac{L_{buffer}}{t_{dataup} - t_{commsup}}$$

in which, $L_{buffer}$ is size of the buffer, which equals the size of each data upload;

$t_{dataup}$ is time of step (i); and $t_{commsup}$ is time for the signalling for sending the data from the SIM to the buffer in step (h);

wherein the $t_{dataup}$ parameter is calculated on the test server as the time from initial packet received to final packet received, and the $t_{commup}$ parameter is measured and calibrated by laboratory testing, and wherein the server determines a desired size for the payload according to a calculation to ensure that real time performance is not adversely affected.

2. The method as claimed in claim 1, wherein in step (a), the payload is included in a post request from the test server, and the $t_{data}$ parameter is calculated by the test server as the time from an initial test trigger of the post request to end of step (f).

3. The method as claimed in claim 1, wherein the SIM uses an application downloaded from the test server for said test processing.

4. The method as claimed in claim 1, wherein the memory and the SIM are within a modem of the device.

5. The method as claimed in claim 1, wherein the server determines a plurality of time periods for multiple occurrences of steps (h) and (i) and averages them for improved accuracy.

6. The method as claimed in claim 1, wherein the server performs a latency test by sending a test signal to the SIM and determining time for a response to be received.

7. The method as claimed in claim 1, wherein the payload sizing is lower for slower connections at the device and higher for faster connection.

8. A non-transitory computer storage medium comprising software code for performing the method of claim 1 when executed by digital processors of said test server and communications device.

* * * * *